(12) United States Patent
Yang et al.

(10) Patent No.: US 11,397,597 B2
(45) Date of Patent: Jul. 26, 2022

(54) APPLICATION PROCESSING METHOD AND APPARATUS

(71) Applicant: Alipay (Hangzhou) Information Technology Co., Ltd., Zhejiang (CN)

(72) Inventors: Li Yang, Zhejiang (CN); Sudong Liu, Zhejiang (CN); Zubin Kang, Zhejiang (CN); Yueting Li, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/363,795

(22) Filed: Jun. 30, 2021

(65) Prior Publication Data

US 2022/0004404 A1 Jan. 6, 2022

(30) Foreign Application Priority Data

Jul. 2, 2020 (CN) .......................... 202010626956.8

(51) Int. Cl.

| | | |
|---|---|---|
| *G06F 9/451* | (2018.01) | |
| *G06F 3/048* | (2013.01) | |
| *G06F 3/04812* | (2022.01) | |
| *G06F 3/04842* | (2022.01) | |
| *G06F 9/48* | (2006.01) | |

(52) U.S. Cl.
CPC .......... *G06F 9/451* (2018.02); *G06F 3/04812* (2013.01); *G06F 3/04842* (2013.01); *G06F 9/485* (2013.01)

(58) Field of Classification Search
CPC .. G06F 9/451; G06F 3/04812; G06F 3/04842; G06F 9/485
See application file for complete search history.

(56) References Cited

U.S. PATENT DOCUMENTS

| | | | | |
|---|---|---|---|---|
| 9,043,434 B1* | 5/2015 | Sadri | ..................... | G06F 16/972 709/217 |
| 10,019,522 B2* | 7/2018 | Fang | .................. | G06F 16/9535 |
| 11,100,187 B2* | 8/2021 | Ge | ...................... | G06F 16/2365 |
| 2005/0021862 A1* | 1/2005 | Schroeder | .............. | G06Q 30/02 709/246 |
| 2007/0124693 A1* | 5/2007 | Dominowska | ...... | G06F 16/9535 715/772 |

(Continued)

FOREIGN PATENT DOCUMENTS

| | | |
|---|---|---|
| CN | 106844019 A | 6/2017 |
| CN | 110058989 A | 7/2019 |

*Primary Examiner* — Daeho D Song
(74) *Attorney, Agent, or Firm* — Seed IP Law Group LLP

(57) ABSTRACT

Embodiments of the present specification provide an application processing method and apparatus. The method includes: checking whether an invoking condition corresponding to a jump control of a home application is triggered; in response to the invoking condition being triggered, invoking the jump control and displaying a jump window of the jump control on a current interface; and in response to an operation of jumping to a destination application triggered by a user through the jump window, redirecting the user from the current interface to an interface corresponding to the destination application. The jump control is associated with at least one destination application, and the destination application includes one or more of a sub-application of the home application or another application.

21 Claims, 11 Drawing Sheets

(56) References Cited

U.S. PATENT DOCUMENTS

| | | | |
|---|---|---|---|
| 2012/0317244 A1* | 12/2012 | Liang | H04L 67/02 |
| | | | 709/219 |
| 2016/0330297 A1* | 11/2016 | Sun | H04L 67/10 |
| 2016/0335231 A1* | 11/2016 | Hu | G06F 40/134 |
| 2017/0277390 A1* | 9/2017 | Chang | G06F 11/3452 |
| 2017/0293403 A1* | 10/2017 | Xiangli | G06F 3/0482 |
| 2018/0365038 A1* | 12/2018 | Dong | G06F 8/61 |
| 2019/0026383 A1* | 1/2019 | Ge | H04W 4/18 |
| 2019/0104346 A1* | 4/2019 | Wu | H04N 21/812 |
| 2019/0220159 A1* | 7/2019 | Fan | G06F 3/04817 |
| 2019/0266034 A1* | 8/2019 | Wang | G06F 3/0481 |
| 2019/0303082 A1* | 10/2019 | Hao | G06T 11/60 |
| 2020/0026604 A1* | 1/2020 | Miedziejewski | G06F 11/1423 |
| 2020/0192731 A1* | 6/2020 | Dong | H04L 67/34 |
| 2021/0168234 A1* | 6/2021 | Gao | G06F 3/0482 |

\* cited by examiner

APPLICATION PROCESSING METHOD AND APPARATUS

BACKGROUND

Technical Field

The present specification relates to the field of computer technologies, and in particular, to an application processing method and apparatus.

Description of the Related Art

With the rapid development of computer and Internet technologies, applications installed on mobile phones, tablet computers, computers and other terminal devices to complete one or more specific tasks have sprung up in people's lives and work. Generally, one application may include multiple different functional modules, such as a membership information module, multiple service modules, etc. Generally, any functional module may have multiple layers of pages, and the pages constituting a functional module may form a linked structure with great depth. When users use different functions in the application, they need to return to the home page from one functional module layer by layer in the original path and then enter other functional modules. The operations are cumbersome.

In view of the previous description, there is an urgent need to provide a technical solution to implement quick links between functional pages in the same software application or different software applications.

BRIEF SUMMARY

Embodiments of the present specification provide an application processing method. The method includes: checking whether an invoking condition corresponding to a jump control of a home application is triggered, where the jump control is associated with at least one destination application, and the destination application may include one or more of a sub-application of the home application or another application; in response to the invoking condition being triggered, invoking the jump control and displaying a jump window of the jump control on a current interface; and in response to an operation of jumping to the destination application being triggered by a user through the jump window, redirecting the user from the current interface to an interface corresponding to the destination application.

Embodiments of the present specification further provide an application processing apparatus. The apparatus includes: a detecting module, configured to check whether an invoking condition corresponding to a jump control of a home application is triggered, where the jump control is associated with at least one destination application, and the destination application includes one or more of a sub-application of the home application or another application; an invoking module, configured to: in response to the invoking condition corresponding to the jump control being triggered, invoking the jump control; a display module, configured to display a jump window of the jump control on a current interface; and a first jump module, configured to: in response to an operation of redirecting the user to the destination application being triggered by a user through the jump window, redirecting the user from the current interface to an interface corresponding to the destination application.

Embodiments of the present specification further provide an application processing device. The device includes a processor, and a memory configured to store a computer-executable instruction, where when the executable instruction is executed, the processor is enabled to: check whether an invoking condition corresponding to a jump control of a home application is triggered, where the jump control is associated with at least one destination application, and the destination application includes one or more of a sub-application of the home application or another application; in response to the invoking condition being triggered, invoking the jump control and displaying a jump window of the jump control on a current interface; and in response to an operation of jumping to the destination application being triggered by a user through the jump window, redirecting the user from the current interface to an interface corresponding to the destination application.

Embodiments of the present specification further provide a storage medium. The storage medium is configured to store a computer-executable instruction that, when executed, implement the following procedure: checking whether an invoking condition corresponding to a jump control of a home application is triggered, where the jump control is associated with at least one destination application, and the destination application includes one or more of a sub-application of the home application or another application; in response to the invoking condition being triggered, invoking the jump control and displaying a jump window of the jump control on a current interface; and in response to an operation of jumping to the destination application being triggered by a user through the jump window, redirecting the user from the current interface to an interface corresponding to the destination application.

BRIEF DESCRIPTION OF THE SEVERAL VIEWS OF THE DRAWINGS

To describe the technical solutions in the embodiments of the present specification or in the existing technology more clearly, the following briefly describes the accompanying drawings needed for describing the embodiments or the existing technology.

Clearly, the accompanying drawings in the following descriptions merely show some embodiments of the present application, and a person of ordinary skill in the art can still derive other drawings from these accompanying drawings without creative efforts.

DETAILED DESCRIPTION

To enable a person skilled in the art to better understand the technical solutions in one or more embodiments of the present specification, the following clearly and fully describes the technical solutions in one or more embodiments of the present specification with reference to the accompanying drawings in the embodiments of the present specification. Clearly, the described embodiments are merely some rather than all of the embodiments of the present specification. Based on one or more embodiments of the present specification, all other embodiments obtained by a person of ordinary skill in the art without creative efforts shall fall within the protection scope of the present specification.

The technical design of one or more embodiments of the present specification includes to associate a jump control with a sub-application in a home application or with another application, and display the jump control on some interfaces of the home application, thereby implementing quick redirection from some interfaces to an interface corresponding to the sub-application or the another application associated with the jump control. In view of the previous description, one or more embodiments of the present specification provide an application processing method, apparatus, device, and storage medium, which are described in detail below.

It should be noted that, in one or more embodiments of the present specification, the home applications and other applications are applications installed on terminal devices such as mobile phones, tablet computers, computers, etc., and the sub-applications are functional modules in the applications.

First, one or more embodiments of the present specification provide an application processing method. The method can be applied to an application client device. That is, the method provided in one or more embodiments of the present specification can be performed by an application processing apparatus installed on the application client device.

Figure 1:
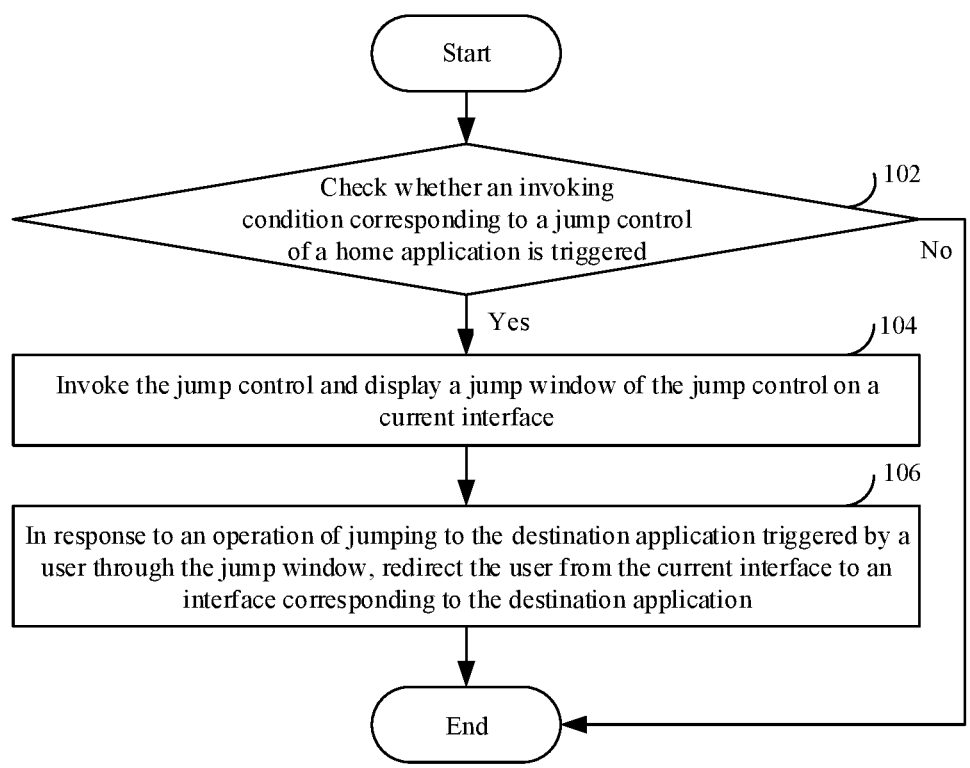
FIG. 1 is a first flowchart illustrating an application processing method according to one or more embodiments of the present specification.

FIG. 1 is a flowchart illustrating a first method of application processing methods according to one or more embodiments of the present specification. As shown in FIG. 1, the method includes at least the following steps:

Step 102: Check whether an invoking condition corresponding to a jump control of a home application is triggered. In response to the invoking condition being triggered, perform step 104.

The jump control is associated with at least one destination application, and the destination application includes one or more of a sub-application of the home application or another application. Specifically, the destination application can include only the sub-application(s) of the home application, or include only the another application(s). Alternatively, the destination application includes both the sub-application(s) of the home application and the another application(s). The sub-application of the home application is a functional module in the home application, and the another application is an application other than the home application on the terminal device.

In some embodiments, during specific implementation, the invoking condition can be configured based on behavior trajectory information of the user in the home application, or can be configured based on the sub-application started by the user or the interface opened by the user.

In addition, it should be noted that the home application can be any application installed on the terminal device, and the specific application referred to by the home application is not limited by the examples provided in the present specification.

Step 104: Invoke the jump control and display a jump window of the jump control on a current interface.

The jump window of the jump control can be customized as an icon or a pattern, etc. The jump window can be displayed as a floating window on the current interface, according to some embodiments.

Step 106: In response to an operation of jumping to the destination application triggered by a user through the jump window, redirect the user from the current interface to an interface corresponding to the destination application.

In some embodiments, in step 106, redirecting the user from the current interface to the interface corresponding to the destination application in response to the operation of jumping to the destination application triggered by the user can specifically include the following procedure: in response to a touch operation performed by the user on the jump window, displaying the destination application associated with the jump control on the current interface; and in response to a jump operation performed by the user on the destination application, redirecting the user from the current interface to the interface corresponding to the destination application.

In some specific implementations, when the user taps the jump window, the destination application associated with the jump control is displayed on the current interface. Specifically, icon information of the associated destination application can be displayed. When the user taps an icon of a destination application, the current interface is redirected to the interface corresponding to the icon of the destination application tapped by the user.

In the application processing method provided in one or more embodiments of the present specification, the invoking condition corresponding to the jump control is pre-configured, and under different invoking conditions, the jump control is associated with different destination applications. In this way, when the invoking condition is triggered, the jump control can be invoked, and the jump window of the jump control is displayed on the current interface. In addition, when the user performs the operation of jumping to the destination application through the jump window, the current interface can be redirected directly to the interface corresponding to the destination application. In this way, quick redirection (e.g., quick links) between different sub-applications in the same application or between different applications can be implemented, making the redirection between different sub-applications in the same application or between different applications convenient, fast, and simple.

In some embodiments of the present specification, there are multiple invoking conditions corresponding to the jump control, and the destination application associated with the jump control is determined based on a currently satisfied invoking condition.

That is, under different invoking conditions, the jump control is usually associated with different destination applications. In some cases, the jump control is associated with the same destination application under multiple different invoking conditions. For example, under invoking condition 1, the jump control is associated with destination application 1 and destination application 2; under invoking condition 2, the jump control is associated with destination application 1 and destination application 3. That is, under invoking condition 1 and invoking condition 2, the jump control is associated with destination application 1. For another example, under invoking condition 1, the jump control is associated with destination application 1 and destination application 2; under invoking condition 2, the jump control is associated with destination application 1 and destination application 2. That is, under invoking condition 1 and invoking condition 2, the jump control is associated with destination application 1 and destination application 2.

In some embodiments, in some specific implementations, the destination application associated with the jump control can be pre-configured under each invoking condition. For example, a possible mapping relationship between the configured destination application and the invoking condition is shown in Table 1.

TABLE 1

| Destination application | Invoking condition |
|---|---|
| Destination application 1 | Invoking condition 1 |
| Destination application 2 | Invoking condition 1 |
| Destination application 3 | Invoking condition 2 |

As shown in Table 1, under invoking condition 1, the jump control is associated with destination application 1 and destination application 2; under invoking condition 2, the jump control is associated with destination application 3. Table 1 is only shown as an example, and does not intend to limit the scope of the present disclosure.

To facilitate the understanding of the methods provided in one or more embodiments of the present specification, the following describes in detail specific implementation processes of the steps described above.

In some embodiments, the invoking condition can be configured based on a behavior trajectory of the user in the home application. Specifically, a server of the home application can collect the behavior trajectory information of the user in the home application, and analyze sub-applications or other applications that the user may be redirected to under different behavior trajectories. The sub-application or another application that the user may be redirected to under a specific behavior trajectory is used as a destination application corresponding to the current behavior trajectory of the user, so that the destination application is associated with the behavior trajectory of the user and the jump control.

Correspondingly, in this case, in step 102, checking whether the invoking condition corresponding to the jump control of the home application is triggered specifically includes the following procedure: obtaining behavior trajectory information of the user in the home application; checking whether the behavior trajectory information matches pre-configured target behavior trajectory information corresponding to the jump control; and in response to that the behavior trajectory information matches the pre-configured target behavior trajectory information corresponding to the jump control, and making sure that the invoking condition is triggered, where the destination application associated with the jump control is the application corresponding to the behavior trajectory information.

Specifically, in one or more embodiments of the present specification, each node in the behavior trajectory information is formed by each page in the home application. For example, in some specific implementations, pages that the user browses when performing operations in the home application are page 1, page 3, page 4, and page 6 in sequence, and therefore the behavior trajectory information of the user in the home application is page 1-page 3-page 4-page 6.

It should be noted that matching of behavior trajectory information means that the behavior trajectory and the target behavior trajectory must be the same. For example, in response to the behavior trajectory information of the user being page 1-page 2-page 3, the target behavior trajectory information that matches the behavior trajectory information should also be page 1-page 2-page 3.

In some specific implementations, performing matching between the behavior trajectory information and the pre-configured target behavior trajectory information corresponding to each destination application can be specifically implemented using the following procedure:

The first node (page) information in the behavior trajectory information is compared with the first node (page) information in the target behavior trajectory information corresponding to each destination application to screen the target behavior trajectory information that is consistent with the first node information in the behavior trajectory information. The second node (page) information in the behavior trajectory information is compared with the second node (page) information in the screened target behavior trajectory information to screen the target behavior trajectory information that is consistent with the second node information in the behavior trajectory information, and so on, until the target behavior trajectory information consistent with the last node (page) information in the behavior trajectory information is screened as the target behavior trajectory information that matches the behavior trajectory information.

In addition, it should be noted that in one or more embodiments of the present specification, when behavior trajectories of the user in the home application are different, other sub-applications or other applications the user may need to access are also different. Therefore, in the embodiments of the present specification, the destination applications configured for different behavior trajectory information are different.

For example, in some specific implementations, in response to the behavior trajectory information of the user in the home application being page 1-page 2-page 4, the corresponding destination applications can include destination application A, destination application B, and destination application C; in response to the behavior trajectory information of the user in the home application being page 1-page 3-page 5, the corresponding destination applications can include destination application A, destination application D, and destination application F. This is only an example description, and different destination applications are configured for different behavior trajectory information, which does not intend to limit the scope of the present disclosure.

In some embodiments, in other specific implementations, the invoking condition can be configured based on the sub-application started by the user in the home application.

Specifically, a client device can determine the destination application that the user may be redirected to under each sub-application according to the behavior information of the user in the home application, so that the destination application is associated with the sub-application information and the jump control. Alternatively, in some specific implementations, the destination application corresponding to each sub-application that is customized and input by the user is received, so that the sub-application is associated with the destination application and the jump control.

Correspondingly, in this case, in step 102, checking whether the invoking condition corresponding to the jump control of the home application is triggered specifically includes the following procedure: obtaining sub-application information browsed by the user in the home application; checking whether the sub-application information matches pre-configured target sub-application information corresponding to the jump control; and in response to the sub-application information matching the pre-configured target sub-application information corresponding to the jump control, making sure the invoking condition is triggered, where the destination application associated with the jump control is the application corresponding to the sub-application information.

The matching of the sub-application information means that the opened sub-application interfaces are consistent. For example, in some specific implementations, the target sub-application information corresponding to the destination application 1 is target sub-application 1. When the user browses target sub-application 1 in the home application, it is determined that the sub-application information browsed by the user matches the target sub-application information corresponding to the destination application 1.

Generally, when the user browses different sub-applications in the home application, the sub-applications or other applications that need to be redirected to in the next step are also different. Therefore, in one or more embodiments of the present specification, destination applications configured for different sub-applications in the home application are different. For example, the user usually uses sub-application A in application 1 within a specific period of time, and after using sub-application A, the user usually uses sub-application B in application 1. Therefore, in this case, the destination applications configured for sub-application A includes at least sub-application B.

In the embodiments of the present specification, when a destination application is configured for each sub-application, the corresponding destination application can be configured in a user-defined manner. Alternatively, the destination application can be automatically configured by analyzing the behavior information of the user on the client device. Generally, when the destination application is configured in a user-defined manner, the user may be allowed to add a destination application or delete the configured destination application.

The behavior information of the user on the client device can include the browsing habit information, the operation behavior information, etc., of the user in the client device.

In some embodiments, the client device can automatically recommend a destination application to the user. However, not all users want the client device to automatically recommend a destination application. Therefore, when the user authorizes (that is, agrees on) the recommendation, the client device can automatically recommend a destination application to the user. For example, in some specific implementations, when detecting that the user requests to access the home application, the client device determines the destination application that the user may need to be redirected to, and associates the destination application with the jump control.

Therefore, in some specific implementations, in step 102, checking whether the invoking condition corresponding to the jump control of the home application is triggered can alternatively be implemented in the following way: checking whether the user authorizes recommendation of the destination application; in response to the user authorizing the recommendation of the destination application, obtaining one or more of behavior information of the user or client information of the home application, where the behavior information includes one or more of information about operation behavior in the home application, information about a received coupon, and information about a geographic location of the user; the client information of the home application includes information about a network to which a client device of the home application is connected; and determining whether there is a destination application based on the one or more of the behavior information or the client information of the home application; in response to there being a destination application, making sure that the invoking condition is triggered, and associating the jump control with the destination application.

In some embodiments, in some specific implementations, when the user enables the home application, the client device can ask the user whether to enable the function of automatically recommending a destination application; in response to the user agreeing, the client device performs the operation of automatically recommending a destination application, and every time the user enables the home application subsequently, the client device performs the operation of automatically recommending a destination application; in response to the user not agreeing, the client device no longer asks the user whether to enable the function of automatically recommending a destination application every time the user enables the home application subsequently.

The behavior information of the user can include the user's browsing behavior, tapping behavior, browsing duration information, frequently accessed application functions, received coupon information, purchased ticket information such as tickets, air tickets, movie tickets, drama tickets, etc., in the home application. The client information can specifically include location information of the client device, a wireless fidelity (Wi-Fi) network connected to the client device, etc.

For ease of understanding, the following description is provided based on examples.

For example, in some specific implementations, in response to the user receiving a voucher from a store through the home application, when the user enables the home application, and the user authorizes the recommendation of the destination application, the client device detects that there is a voucher from a store in the home application of the user, and recommends a sub-application or application corresponding to the store as a destination application to the user, and makes sure that an invoking condition corresponding to the destination application is triggered, and associates the jump control with the recommended destination application. In addition, the operation of invoking the jump control is performed to display the jump window of the jump control on the current interface. When the user taps the jump window, the icon of the recommended destination application is displayed on the current interface. When the user taps the icon of the destination application, the current interface is redirected to the interface corresponding to the destination application.

In one or more embodiments of the present specification, the destination application is automatically recommended to the user based on one or more of behavior information of the user in the home application or client information of the home application, increasing convenience for the user to be redirected to an application. In addition, because the destination application is generated according to one or more of the behavior information of the user or the client information, the destination application better satisfies actual needs of the user.

In some embodiments, in one or more embodiments of the present specification, although the jump control is associated with the destination application, there may be a case in which none of the destination applications associated with the jump control is an application the user actually wants to be redirected to. Therefore, in the embodiments of the present specification, to help quickly redirect the user to the application interface that the user wants to open, the jump control is further associated with the voice collecting control.

Therefore, after step 104 of invoking the jump control and displaying the jump window of the jump control on the current interface, the method provided in one or more embodiments of the present specification further includes: in response to a voice collecting operation performed by the user on the voice collecting control, collecting voice information of the user; and determining, based on the voice information, the destination application the user currently needs to be redirected to, and redirecting the user from the current interface to the interface corresponding to the destination application.

That is, in some specific implementations, after the jump window of the jump control is displayed on the current interface, the jump control is associated with the destination application and the voice collecting control. Therefore, when the user taps the jump window of the jump control, the icon of the destination application and the icon of the voice collecting control are displayed on the current interface. When the user wants to be redirected to a sub-application in the home application or another application, the user can tap the icon of the voice collecting control. When the user taps the icon of the voice collecting control, the voice information input by the user is collected through the voice collecting control (for example, the voice information input by the user can be "jump to sub-application A"), and the collected voice information is analyzed to determine sub-application A the user needs to be redirected to, and the operation of redirecting the user to the interface corresponding to sub-application A is performed.

In the embodiments of the present specification, the jump control is associated with the voice collecting control, so as to quickly jump, through speech recognition, to the sub-application or another application the user wants to switch to; especially when none of the destination applications associated with the jump control is an application that the user currently wants to be redirected to, quick redirection to the application can also be implemented.

In addition, some pages (such as the home page of the home application) or sub-applications (such as the code scanning payment function) may not be suitable for quick redirection to the destination application, according to some embodiments. Therefore, when the jump control and the destination application are configured, the jump control and the associated destination application are not directly configured for these pages or sub-applications. In addition, when using the home application, the user may disable the jump control displayed on some pages based on some usage habits of the user. Therefore, the method provided in one or more embodiments of the present specification further includes the following procedure: in response to an operation of disabling the jump control triggered by the user, disabling the jump control, and deleting a mapping relationship between the currently satisfied invoking condition and the jump control.

That is, in the embodiments of the present specification, in response to it being detected that the user has performed an operation of disabling the jump control displayed on a specific page, the jump window of the jump control displayed on the interface is closed and a mapping relationship between the currently satisfied invoking condition and the jump control is deleted. That is, when the invoking condition is triggered again subsequently, the jump control is not invoked.

To facilitate the understanding of the methods provided in one or more embodiments of the present specification, the following describes the methods provided in the embodiments of the present specification with reference to specific embodiments.

Figure 2A:
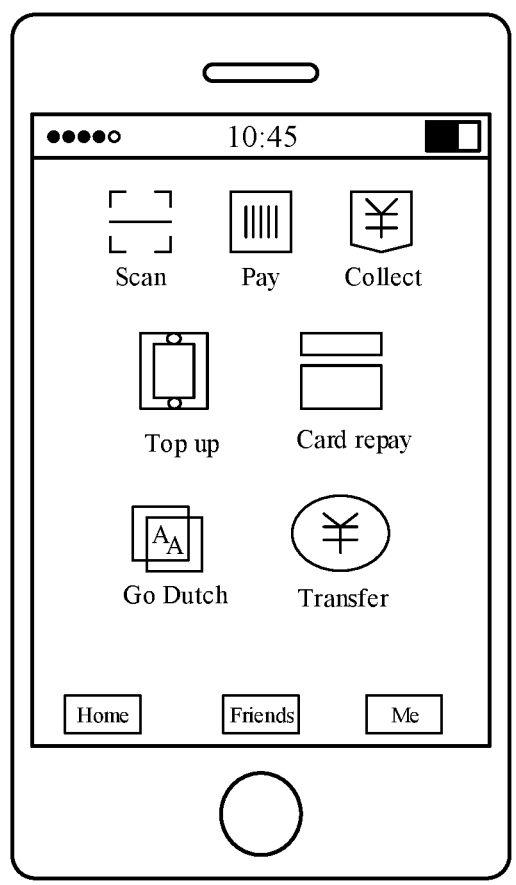
FIG. 2(a) is a first schematic diagram illustrating an application interface in an application processing method according to some embodiments of the present specification.
Figure 2B:
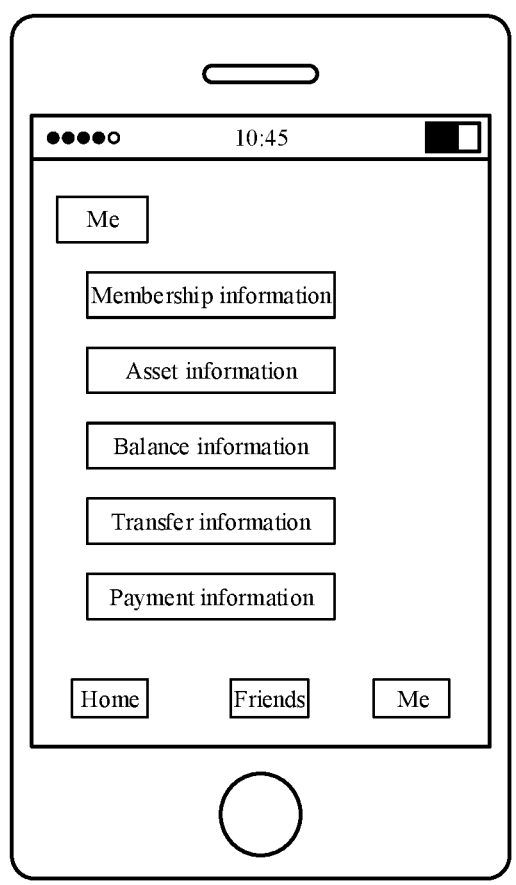
FIG. 2(b) is a second schematic diagram illustrating an application interface in an application processing method according to some embodiments of the present specification.
Figure 2C:
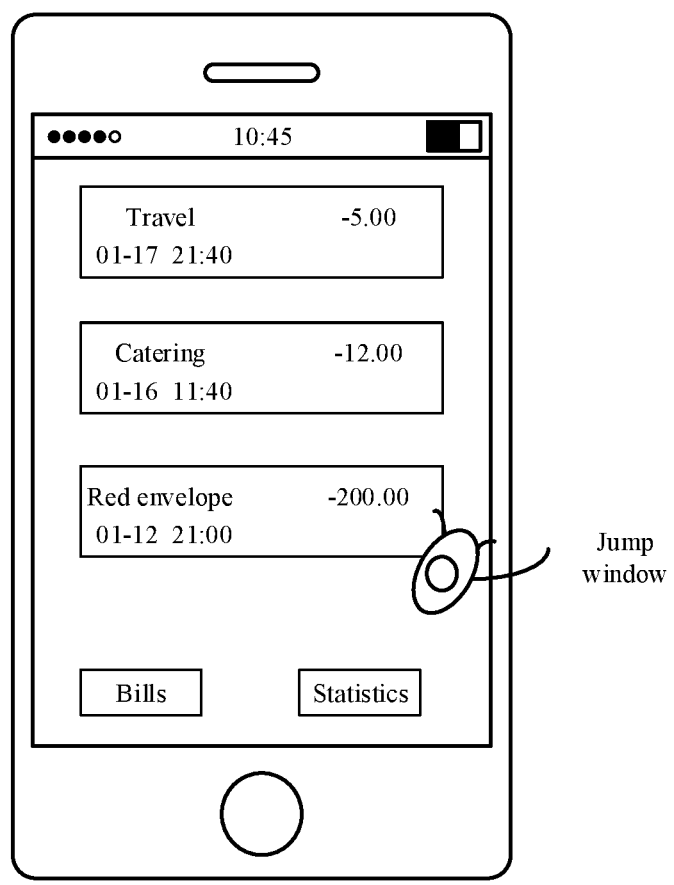
FIG. 2(c) is a third schematic diagram illustrating an application interface in an application processing method according to some embodiments of the present specification.
Figure 2D:
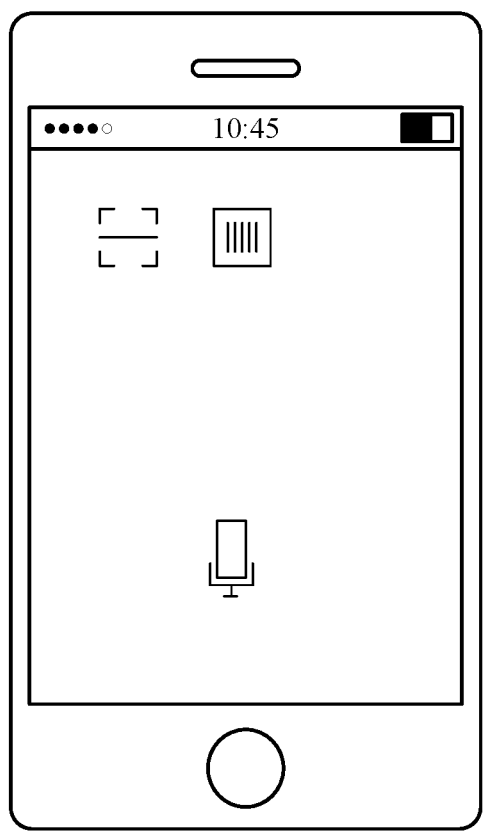
FIG. 2(d) is a fourth schematic diagram illustrating an application interface in an application processing method according to some embodiments of the present specification.

For example, in some specific implementations, the user enables a payment application such as application A, and then enters the home page of application A. As shown in FIG. 2(a), the home page of application A displays icons of sub-applications, and the user taps the clickable control "Me" on the home page of application A and then enters the personal page of the user, which is denoted as page 1. Clickable controls for multiple sub-applications are arranged on page 1. As shown in FIG. 2(b), page 1 displays membership information, asset information, balance information, transfer information, payment information, etc., of the user. In response to the user tapping the clickable control corresponding to "Payment information," the page corresponding to "Payment information" is displayed, which is denoted as page 2. In this case, a behavior trajectory of the user in application A is home page-page 1-page 3. Matching is performed between the behavior trajectory and the preconfigured target behavior trajectory corresponding to each destination application to determine the destination application corresponding to the behavior trajectory, and the jump control is displayed on page 2, as shown in FIG. 2(c). Generally, for the behavior trajectory, the destination application the user may be redirected to includes payment, funds collection, etc., for the payment method. Therefore, the jump control is associated with the payment function, the funds collection function, and the voice collecting control. After the user taps the jump window of the jump control displayed on the current page, the icons of each destination application and the voice collecting control that are associated with the jump control are displayed, as shown in FIG. 2(d). After the user taps an icon, the corresponding interface is directly redirected to. Alternatively, after the user taps the icon of the voice collecting control, voice collection starts, and the application the user needs to be redirected to is determined according to the collected voice, and the corresponding interface is redirected to.

Figure 3:
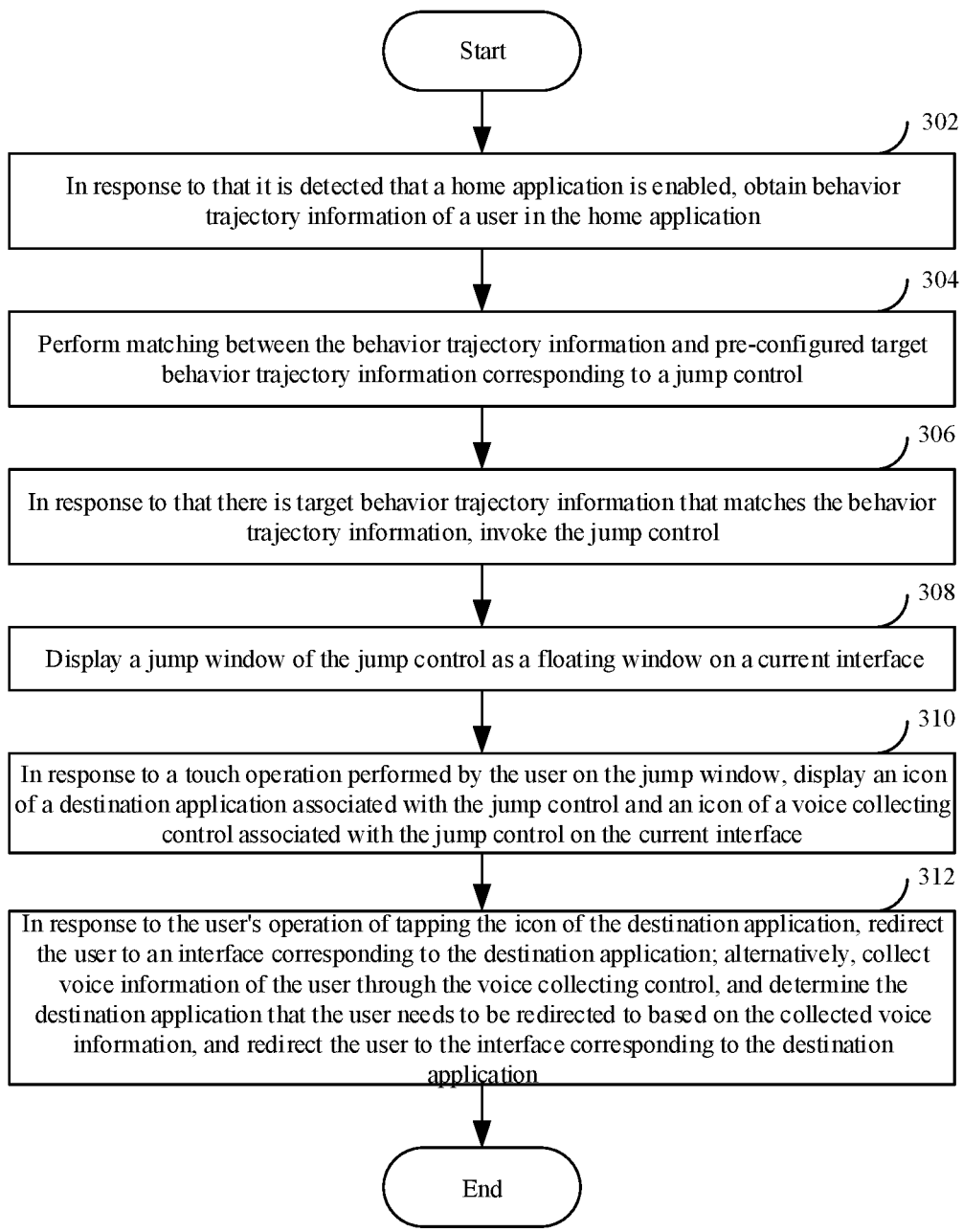
FIG. 3 is a second flowchart illustrating an application processing method according to one or more embodiments of the present specification.

With respect to such application scenario, FIG. 3 is a flowchart illustrating a second method of application processing methods according to one or more embodiments of the present specification. As shown in FIG. 3, the method includes at least the following steps:

Step 302: In response to it being detected that the home application is enabled, obtain behavior trajectory information of the user in the home application.

Step 304: Perform matching between the behavior trajectory information and pre-configured target behavior trajectory information corresponding to the jump control.

The jump control is associated with the destination application, and the jump control is further associated with the voice collecting control.

Step 306: In response to there being target behavior trajectory information that matches the behavior trajectory information, invoke the jump control.

The jump control is associated with the destination application corresponding to the target behavior trajectory information.

Step 308: Display the jump window of the jump control as a floating window on the current interface.

Step 310: In response to a touch operation performed by the user on the jump window, display an icon of the destination application associated with the jump control and an icon of the voice collecting control associated with the jump control on the current interface.

Step 312: In response to the user's operation of tapping the icon of the destination application, redirect the user to the interface corresponding to the destination application; alternatively, collect voice information of the user through the voice collecting control, and determine the destination application the user needs to be redirected to based on the collected voice information, and redirect the user to the interface corresponding to the destination application.

In some embodiments, during specific implementation, the target behavior trajectory information corresponding to each destination application is configured by a server, and is sent to the client device.

In one or more embodiments of the present specification, the client device can automatically recommend a destination application in real time. The following description is provided based on examples.

Figure 4A:
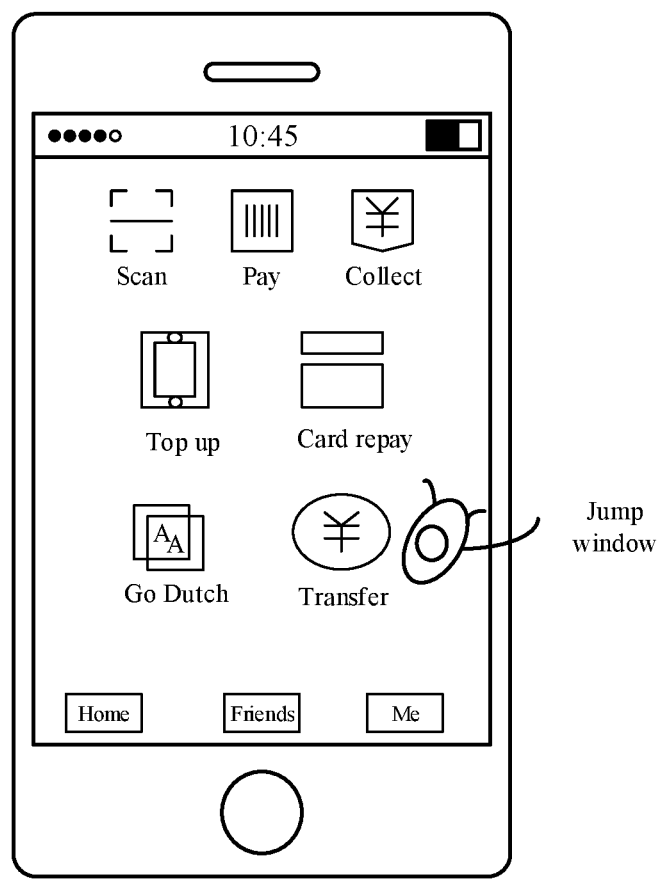
FIG. 4(a) is a fifth schematic diagram illustrating an application interface in an application processing method according to some embodiments of the present specification.
Figure 4B:
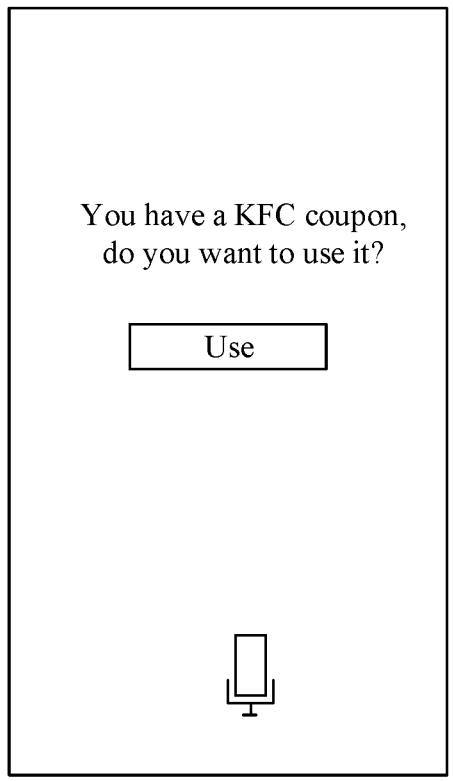
FIG. 4(b) is a sixth schematic diagram illustrating an application interface in an application processing method according to some embodiments of the present specification.
Figure 4C:
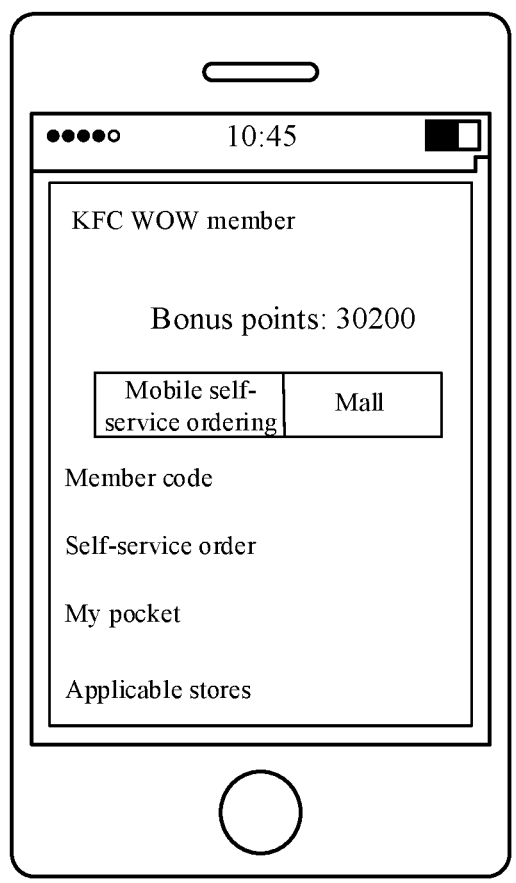
FIG. 4(c) is a seventh schematic diagram illustrating an application interface in an application processing method according to some embodiments of the present specification.

For example, in some specific implementations, it is assumed that the user allows the client device to recommend the destination application. When the user enables application A, the user enters the home page of application A, and the home page of application A is shown in FIG. 2(a). In this case, the client device collects one or more of behavior information of the user in application A or client information, and determines the destination application corresponding to the page according to one or more of the behavior information or the client information. In response to determining that there is a destination application on the page, the client device associates the destination application with the jump control, and displays the jump window of the jump control on the interface, as shown in FIG. 4(a). After the user taps the jump window displayed on the current interface, the client device displays the icon of the destination application associated with the jump control and the icon of the voice collecting control associated with the jump control. FIG. 4(b) shows the icons of the KFC application and the voice collecting control that are associated with the jump control. When the user taps "Use," the client device directly redirects the user to the "KFC ordering interface," as shown in FIG. 4(c). Alternatively, after the user taps the icon of the voice collecting control, the client device starts voice collection, and determines the application function that the user needs to be redirected to according to the collected voice, and jumps to the corresponding application function.

Figure 5:
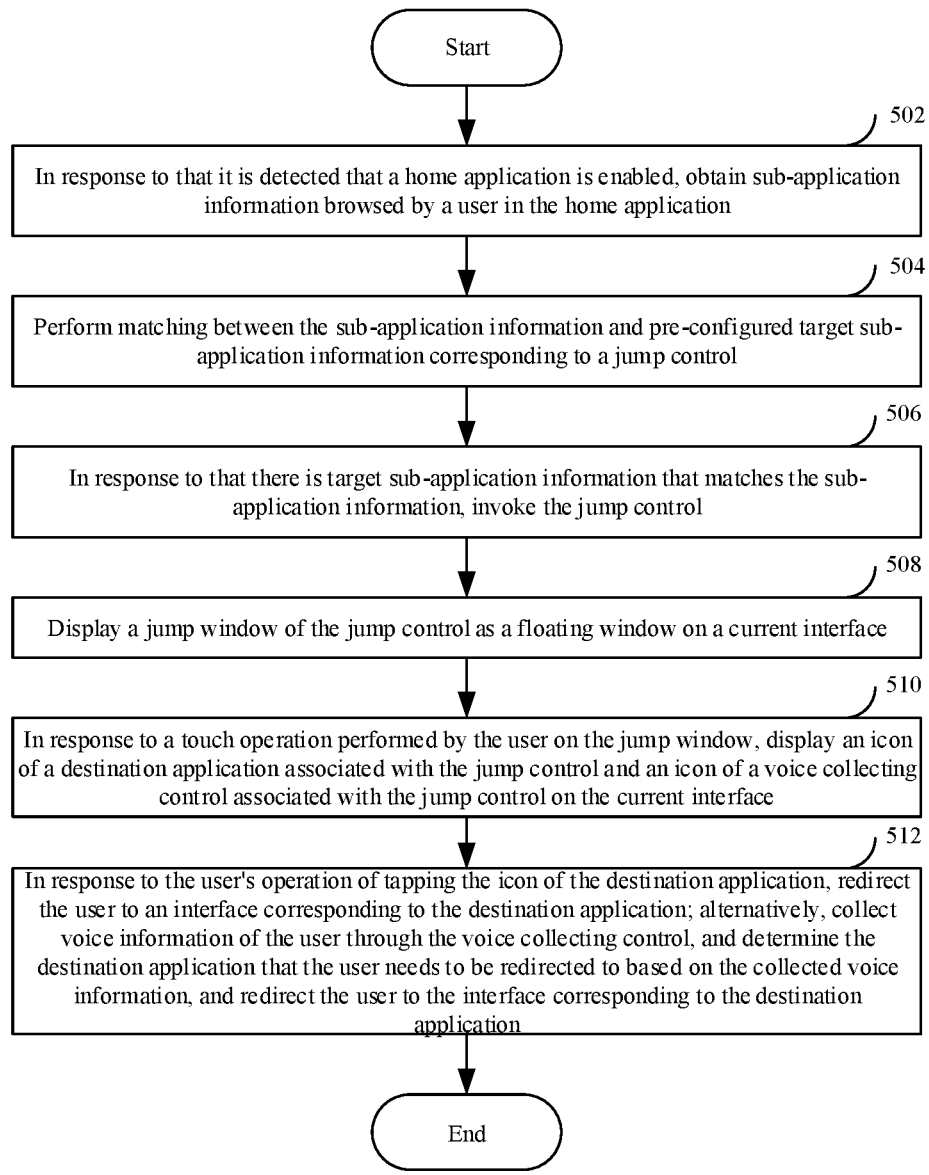
FIG. 5 is a third flowchart illustrating an application processing method according to one or more embodiments of the present specification.

FIG. 5 is a flowchart illustrating a third method of application processing methods according to one or more embodiments of the present specification. As shown in FIG. 5, the method includes at least the following steps:

Step 502: In response to it being detected that the home application is enabled, obtaining sub-application information browsed by the user in the home application.

Step 504: Perform matching between the sub-application information and pre-configured target sub-application information corresponding to the jump control.

The jump control is associated with the destination application, and the jump control is further associated with the voice collecting control.

Step 506: In response to there being target sub-application information that matches the sub-application information, invoking the jump control.

The jump control is associated with the destination application corresponding to the target sub-application information.

Step 508: Display the jump window of the jump control as a floating window on the current interface.

Step 510: In response to a touch operation performed by the user on the jump window, display an icon of the destination application associated with the jump control and an icon of the voice collecting control associated with the jump control on the current interface.

Step 512: In response to the user's operation of tapping the icon of the destination application, redirect the user to the interface corresponding to the destination application; alternatively, collect voice information of the user through the voice collecting control, and determine the destination application the user needs to be redirected to based on the collected voice information, and redirect the user to the interface corresponding to the destination application.

In the application function redirection method in the application provided in the embodiments of the present specification, the invoking condition corresponding to the jump control is pre-configured, and under different invoking conditions, the jump control is associated with different destination applications. In this way, when the invoking condition is triggered, the jump control can be invoked, and the jump window of the jump control is displayed on the current interface. In addition, when the user performs the operation of jumping to the destination application through the jump window, the current interface can be redirected directly to the interface corresponding to the destination application. In this way, quick redirection between different sub-applications in the same application or between different applications can be implemented, making the redirection between different sub-applications in the same application or between different applications convenient, fast, and simple.

Figure 6:
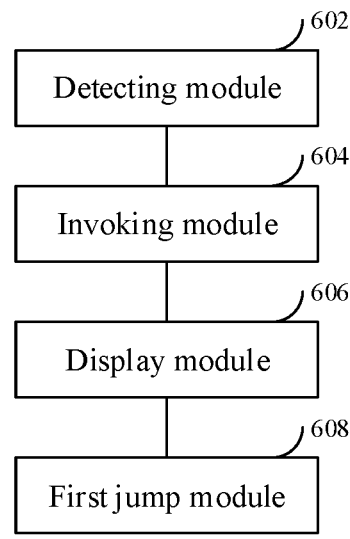
FIG. 6 is a schematic module composition diagram illustrating an application processing apparatus according to one or more embodiments of the present specification.

Corresponding to the application processing method provided in the embodiments shown in FIG. 1 to FIG. 5 of the present specification, based on the same idea, one or more embodiments of the present specification further provide an application processing apparatus for performing the application processing method provided in the embodiments shown in FIG. 1 to FIG. 5 of the present specification. FIG. 6 is a schematic module composition diagram illustrating an application processing apparatus according to one or more embodiments of the present specification. The apparatus includes at least the following modules: a detecting module 602, configured to check whether an invoking condition corresponding to a jump control of a home application is triggered, where the jump control is associated with at least one destination application, and the destination application includes one or more of a sub-application of the home application or another application; an invoking module 604, configured to: in response to the invoking condition corresponding to the jump control being triggered, invoking the jump control; a display module 606, configured to display a jump window of the jump control on a current interface; and a first jump module 608, configured to: in response to an operation of jumping to the destination application triggered by the user through the jump window, redirect the user from the current interface to an interface corresponding to the destination application.

In some embodiments, there are multiple invoking conditions corresponding to the jump control, and the destination application associated with the jump control is determined based on a currently satisfied invoking condition.

In some embodiments, the detecting module 602 includes: a first acquisition unit, configured to obtain behavior trajectory information of the user in the home application; a first matching unit, configured to check whether the behavior trajectory information matches pre-configured target behavior trajectory information corresponding to the jump control; and a first determination unit, configured to: in response to the behavior trajectory information matching the pre-configured target behavior trajectory information corresponding to the jump control, making sure the invoking condition is triggered, where the destination application associated with the jump control is the application corresponding to the behavior trajectory information.

In some embodiments, the detecting module 602 includes: a second acquisition unit, configured to obtain sub-application information browsed by the user in the home application; a second matching unit, configured to check whether the sub-application information matches pre-configured target sub-application information corresponding to the jump control; and a second determination unit, configured to: in response to the sub-application information matching the pre-configured target sub-application information corresponding to the jump control, making sure the invoking condition is triggered, where the destination application associated with the jump control is the application corresponding to the sub-application information.

In some embodiments, the detecting module 602 includes: a detecting unit, configured to check whether the user authorizes recommendation of the destination application; a third acquisition unit, configured to: in response to the user authorizing the recommendation of the destination application, obtaining one or more of behavior information of the user or client information of the home application, where the behavior information includes one or more of information about operation behavior in the home application, information about a received coupon, and information about a geographic location of the user; the client information of the home application including information about a network to which a client device of the home application is connected; a third determination unit, configured to determine whether there is a recommendable destination application based on the one or more of the behavior information or the client information of the home application; and a fourth determination unit, configured to: in response to there being a recommendable destination application, making sure the invoking condition is triggered, and associating the jump control with the recommendable destination application.

In some embodiments, the first jump module 608 includes: a display unit, configured to: in response to a touch operation performed by the user on the jump window, display the destination application associated with the jump control on the current interface; and a jump unit, configured to: in response to a jump operation performed by the user on the destination application, redirect the user from the current interface to the interface corresponding to the destination application.

In some embodiments, the jump control is associated with a voice collecting control; and correspondingly, the apparatus provided in one or more embodiments of the present specification further includes: a collecting module, configured to: in response to a voice collecting operation performed by the user on the voice collecting control, collect voice information of the user; a determination module, configured to determine, based on the voice information, the destination application the user currently needs to be redirected to; and a second jump module, configured to redirect the user from the current interface to the interface corresponding to the destination application.

In some embodiments, the apparatus provided in one or more embodiments of the present specification further includes: a disabling module, configured to: in response to an operation of disabling the jump control triggered by the user, disable the jump control; and a deleting module, configured to delete a mapping relationship between the currently satisfied invoking condition and the jump control.

The application processing apparatus provided in the embodiments of the present specification can further perform the method that is performed by the application processing apparatus in FIG. 1 to FIG. 5, and implement the functions of the application processing apparatus in the embodiments shown in FIG. 1 to FIG. 5. Details are omitted herein for simplicity.

In the application processing apparatus provided in one or more embodiments of the present specification, the invoking condition corresponding to the jump control is pre-configured, and under different invoking conditions, the jump control is associated with different destination applications. In this way, when the invoking condition is triggered, the jump control can be invoked, and the jump window of the jump control is displayed on the current interface. In addition, when the user performs the operation of jumping to the destination application through the jump window, the current interface can be redirected directly to the interface corresponding to the destination application. In this way, quick redirection between different sub-applications in the same application or between different applications can be implemented, making the redirection between different sub-applications in the same application or between different applications convenient, fast, and simple.

Figure 7:
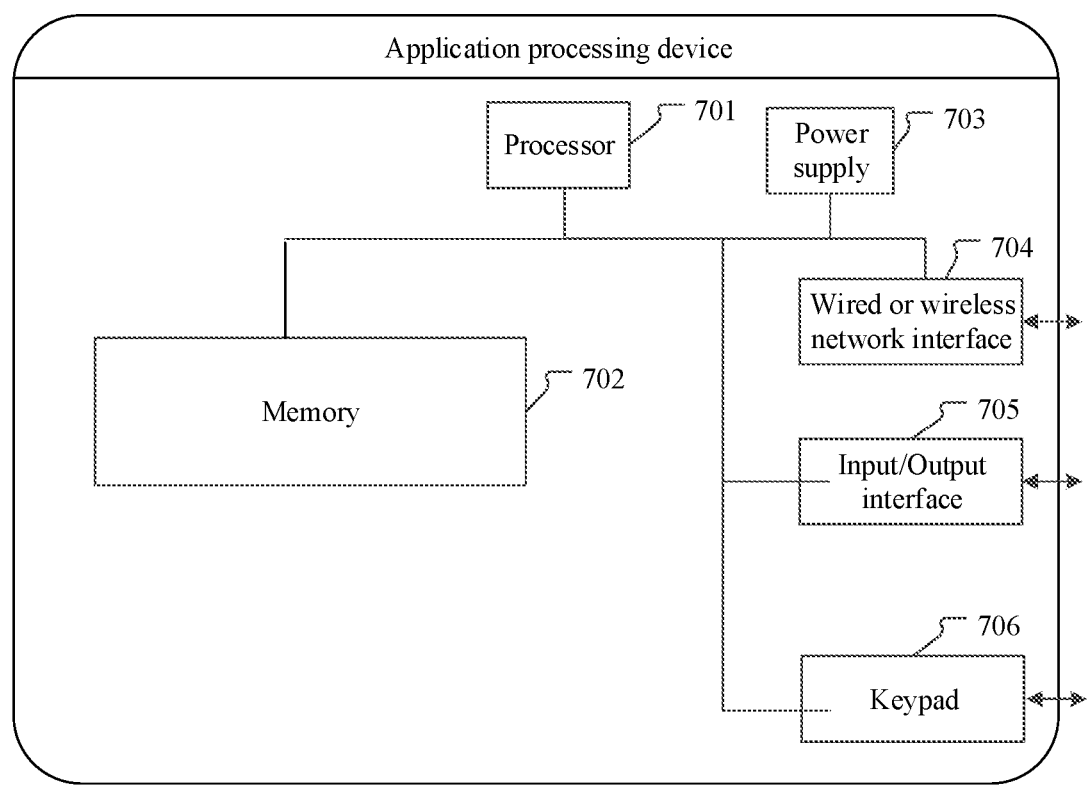
FIG. 7 is a schematic structural diagram illustrating an application processing device according to one or more embodiments of the present specification.

Further, based on the methods shown in FIG. 1 to FIG. 5, embodiments of the present specification further provide an application processing device, as shown in FIG. 7.

The application processing device can differ greatly due to a difference in configuration or performance, and can include one or more processors 701 and one or more memories 702. The memory 702 can store one or more applications or data. The memory 702 can be a temporary storage or a persistent storage. The application stored in the memory 702 can include one or more modules (not shown in the figure), and each module can include a series of computer-executable instruction information in the application processing device. Still further, the processor 701 can be configured to communicate with the memory 702 to execute a series of computer-executable instruction information in the memory 702 on the application processing device. The application processing device can further include one or more power supplies 703, one or more wired or wireless network interfaces 704, one or more input/output interfaces 705, one or more keypads 706, etc.

In some specific embodiments, the application processing device includes a memory and one or more programs, where the one or more programs are stored in the memory, and the one or more programs can include one or more modules, and each module can include a series of computer-executable instruction information in the application processing device. One or more processors are configured to execute the computer-executable instruction information included in the one or more programs to perform the following operations: checking whether an invoking condition corresponding to a jump control of a home application is triggered, where the jump control is associated with at least one destination application, and the destination application includes one or more of a sub-application of the home application or another application; in response to the invoking condition being triggered, invoking the jump control and displaying a jump window of the jump control on a current interface; and in response to an operation of jumping to the destination application triggered by a user through the jump window, redirecting the user from the current interface to an interface corresponding to the destination application.

In some embodiments, when the computer-executable instruction information is executed, there are multiple invoking conditions corresponding to the jump control, and the destination application associated with the jump control is determined based on a currently satisfied invoking condition.

In some embodiments, when the computer-executable instruction information is executed, checking whether the invoking condition corresponding to the jump control of the home application is triggered includes: obtaining behavior trajectory information of the user in the home application; checking whether the behavior trajectory information matches pre-configured target behavior trajectory information corresponding to the jump control; and in response to the behavior trajectory information matching the pre-configured target behavior trajectory information corresponding to the jump control, making sure the invoking condition is triggered, where the destination application associated with the jump control is the application corresponding to the behavior trajectory information.

In some embodiments, when the computer-executable instruction information is executed, checking whether the invoking condition corresponding to the jump control of the home application is triggered includes: obtaining sub-application information browsed by the user in the home application; checking whether the sub-application information matches pre-configured target sub-application information corresponding to the jump control; and in response to the sub-application information matching the pre-configured target sub-application information corresponding to the jump control, making sure that the invoking condition is triggered, where the destination application associated with the jump control is the application corresponding to the sub-application information.

In some embodiments, when the computer-executable instruction information is executed, checking whether the invoking condition corresponding to the jump control of the home application is triggered includes: checking whether the user authorizes recommendation of the destination application; in response to the user authorizing the recommendation of the destination application, obtaining one or more of behavior information of the user or client information of the home application, where the behavior information includes one or more of information about operation behavior in the home application, information about a received coupon, and information about a geographic location of the user; the client information of the home application including information about a network to which a client device of the home application is connected; and determining whether there is a recommendable destination application based on the one or more of the behavior information or the client information of the home application; in response to there being a recommendable destination application, making sure that the invoking condition is triggered, and associating the jump control with the recommendable destination application.

In some embodiments, when the computer-executable instruction information is executed, in response to the operation of jumping to the destination application triggered by the user through the jump window, redirecting the user from the current interface to the interface corresponding to the destination application including: in response to a touch operation performed by the user on the jump window, displaying the destination application associated with the jump control on the current interface; and in response to a jump operation performed by the user on the destination application, redirecting the user from the current interface to the interface corresponding to the destination application.

In some embodiments, when the computer-executable instruction information is executed, the jump control is associated with a voice collecting control; and correspondingly, after invoking the jump control and displaying the jump window of the jump control on the current interface, the application processing device can further perform the following steps: in response to a voice collecting operation performed by the user on the voice collecting control, collecting voice information of the user; and determining, based on the voice information, the destination application the user currently needs to be redirected to, and redirecting the user from the current interface to the interface corresponding to the destination application.

In some embodiments, when the computer-executable instruction information is executed, the application processing device can further perform the following steps: in response to an operation of disabling the jump control triggered by the user, disabling the jump control, and deleting a mapping relationship between the currently satisfied invoking condition and the jump control.

In the application processing device provided in one or more embodiments of the present specification, the invoking condition corresponding to the jump control is pre-configured, and under different invoking conditions, the jump control is associated with different destination applications. In this way, when the invoking condition is triggered, the jump control can be invoked, and the jump window of the jump control is displayed on the current interface. In addition, when the user performs the operation of jumping to the destination application through the jump window, the current interface can be redirected directly to the interface corresponding to the destination application. In this way, quick redirection between different sub-applications in the same application or between different applications can be implemented, making the redirection between different sub-applications in the same application or between different applications convenient, fast, and simple.

Further, based on the methods shown in FIG. 1 to FIG. 5, embodiments of the present specification further provide a storage medium, configured to store computer-executable instruction information; in some specific embodiments, the storage medium can be a USB flash drive, an optical disc, a hard disk, etc., and the computer-executable instruction information stored in the storage medium can be executed by a processor to implement the following procedure: checking whether an invoking condition corresponding to a jump control of a home application is triggered, where the jump control is associated with at least one destination application, and the destination application includes one or more of a sub-application of the home application or another application; in response to the invoking condition being triggered, invoking the jump control and displaying a jump window of the jump control on a current interface; and in response to an operation of jumping to the destination application triggered by a user through the jump window, redirecting the user from the current interface to an interface corresponding to the destination application.

In some embodiments, when the computer-executable instruction information stored in the storage medium is executed by the processor, there are multiple invoking conditions corresponding to the jump control, and the destination application associated with the jump control is determined based on a currently satisfied invoking condition.

In some embodiments, when the computer-executable instruction information stored in the storage medium is executed by the processor, checking whether the invoking condition corresponding to the jump control of the home application is triggered includes: obtaining behavior trajectory information of the user in the home application; checking whether the behavior trajectory information matches pre-configured target behavior trajectory information corresponding to the jump control; and in response to the behavior trajectory information matching the pre-configured target behavior trajectory information corresponding to the jump control, making sure that the invoking condition is triggered, where the destination application associated with the jump control is the application corresponding to the behavior trajectory information.

In some embodiments, when the computer-executable instruction information stored in the storage medium is executed by the processor, checking whether the invoking condition corresponding to the jump control of the home application is triggered includes: obtaining sub-application information browsed by the user in the home application; checking whether the sub-application information matches pre-configured target sub-application information corresponding to the jump control; and in response to the sub-application information matching the pre-configured target sub-application information corresponding to the jump control, making sure that the invoking condition is triggered, where the destination application associated with the jump control is the application corresponding to the sub-application information.

In some embodiments, when the computer-executable instruction information stored in the storage medium is executed by the processor, checking whether the invoking condition corresponding to the jump control of the home application is triggered includes: checking whether the user authorizes recommendation of the destination application; in response to the user authorizing the recommendation of the destination application, obtaining one or more of behavior information of the user or client information of the home application, where the behavior information includes one or more of information about operation behavior in the home application, information about a received coupon, and information about a geographic location of the user; the client information of the home application includes information about a network to which a client device of the home application is connected; and determining whether there is a recommendable destination application based on the one or more of the behavior information or the client information of the home application; in response to there being a recommendable destination application, making sure that the invoking condition is triggered, and associating the jump control with the recommendable destination application.

In some embodiments, when the computer-executable instruction information stored in the storage medium is executed by the processor, in response to the operation of jumping to the destination application triggered by the user through the jump window, redirecting the user from the current interface to the interface corresponding to the destination application includes: in response to a touch operation performed by the user on the jump window, displaying the destination application associated with the jump control on the current interface; and in response to a jump operation performed by the user on the destination application, redirecting the user from the current interface to the interface corresponding to the destination application.

In some embodiments, when the computer-executable instruction information stored in the storage medium is executed by the processor, the jump control is associated with a voice collecting control; and correspondingly, after invoking the jump control and displaying the jump window of the jump control on the current interface, the processor can further perform the following steps: in response to a voice collecting operation performed by the user on the voice collecting control, collecting voice information of the user; and determining, based on the voice information, the destination application the user currently needs to be redirected to, and redirecting the user from the current interface to the interface corresponding to the destination application.

In some embodiments, when the computer-executable instruction information stored in the storage medium is executed by the processor, the processor can further perform the following steps: in response to an operation of disabling the jump control triggered by the user, disabling the jump control, and deleting a mapping relationship between the currently satisfied invoking condition and the jump control.

When the computer-executable instruction information stored in the storage medium provided in one or more embodiments of the present specification is executed by the processor, the invoking condition corresponding to the jump control is pre-configured, and under different invoking conditions, the jump control is associated with different destination applications. In this way, when the invoking condition is triggered, the jump control can be invoked, and the jump window of the jump control is displayed on the current interface. In addition, when the user performs the operation of jumping to the destination application through the jump window, the current interface can be redirected directly to the interface corresponding to the destination application. In this way, quick redirection between different sub-applications in the same application or between different applications can be implemented, making the redirection between different sub-applications in the same application or between different applications convenient, fast, and simple.

The specific embodiments of the present specification are described previously. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing are feasible or may be advantageous.

In the 1990s, whether a technical improvement was a hardware improvement (for example, an improvement to a circuit structure, such as a diode, a transistor, or a switch) or a software improvement (an improvement to a method procedure) could be clearly distinguished. However, as technologies develop, the current improvement for many method procedures can be considered as a direct improvement of a hardware circuit structure. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer-readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Alternatively, the apparatus configured to implement various functions can even be considered as both a software module implementing the method and a structure in the hardware component.

The system, apparatus, module, or unit illustrated in the previous embodiments can be specifically implemented by using a computer chip or an entity, or can be implemented by using a product having a certain function. A typical implementation device is a computer. Specifically, for example, the computer can be a personal computer, a laptop computer, a cellular phone, a camera phone, a smart phone, a personal digital assistant, a media player, a navigation device, an e-mail device, a game console, a tablet computer, a wearable device, or any combination of these devices.

For ease of description, the previous apparatus is described by dividing functions into various units. When the present application is implemented, a function of each unit can be implemented in one or more pieces of software and/or hardware.

A person skilled in the art should understand that the embodiments of the present application may be provided as a method, a system, or a computer program product. Therefore, the present application can use a form of hardware only embodiments, software only embodiments, or embodiments with a combination of software and hardware. Moreover, the present application can use a form of a computer program product that is implemented on one or more computer-usable storage media (including but not limited to a magnetic disk storage, a CD-ROM, an optical memory, etc.) that include computer usable program code.

The present application is described with reference to the flowcharts and/or block diagrams of the method, the device (system), and the computer program product according to the embodiments of the present specification. It should be understood that computer program instruction information can be used to implement each process and/or each block in the flowcharts and/or the block diagrams and a combination of a process and/or a block in the flowcharts and/or the block diagrams. The computer program instruction information can be provided for a general-purpose computer, a dedicated computer, an embedded processor, or a processor of another programmable data processing device to generate a machine, so the instruction information executed by the computer or the processor of the another programmable data processing device generates an apparatus for implementing a specific function in one or more processes in the flowcharts and/or in one or more blocks in the block diagrams.

The computer program instruction information can be stored in a computer-readable memory that can instruct the computer or the another programmable data processing device to work in a specific way, so the instruction information stored in the computer-readable memory generates an artifact that includes an instruction information apparatus. The instruction information apparatus implements a specific function in one or more processes in the flowcharts and/or in one or more blocks in the block diagrams.

The computer program instruction information can alternatively be loaded onto the computer or another programmable data processing device, so that a series of operations and steps are performed on the computer or the another programmable device, thereby generating computer-implemented processing. Therefore, the instruction information executed on the computer or the another programmable device provides steps for implementing a specific function in one or more processes in the flowcharts and/or in one or more blocks in the block diagrams.

In a typical configuration, a computing device includes one or more processors (CPUs), one or more input/output interfaces, one or more network interfaces, and one or more memories.

The memory can include a non-persistent memory, a random access memory (RAM), a non-volatile memory, and/or another form that are in a computer-readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be computer-readable instruction information, a data structure, a program module, or other data. Examples of the computer storage medium include but are not limited to a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computing device. Based on the definition in the present specification, the computer-readable medium does not include transitory media such as a modulated data signal and carrier.

It should be further noted that terms "include," "comprise" or any other variant thereof are intended to cover non-exclusive inclusion, so that processes, methods, products or devices that include a series of elements include not only those elements but also other elements that are not explicitly listed, or further include elements inherent to such processes, methods, products or devices. Without more constraints, an element preceded by "includes a . . . " does not preclude the existence of additional identical elements in the process, method, product or device that includes the element.

A person skilled in the art should understand that the embodiments of the present application can be provided as a method, a system, or a computer program product. Therefore, the present application can use a form of hardware only embodiments, software only embodiments, or embodiments with a combination of software and hardware. Moreover, the present application can use a form of a computer program product that is implemented on one or more computer-usable storage media (including but not limited to a magnetic disk storage, a CD-ROM, an optical memory, etc.) that include computer usable program code.

The present application can be described in a general context of computer-executable instruction information that is executed by a computer, for example, a program module. Generally, the program module includes a routine, a program, an object, a component, a data structure, etc., executing a specific task or implementing a specific abstract data type. The present application can alternatively be practiced in distributed computing environments in which tasks are performed by remote processing devices that are connected through a communications network. In a distributed computing environment, the program module can be located in both local and remote computer storage media including storage devices.

The embodiments in the present specification are described in a progressive way. For same or similar parts of the embodiments, mutual references can be made to the embodiments. Each embodiment focuses on a difference from other embodiments. Particularly, a system embodiment is basically similar to a method embodiment, and therefore is described briefly. For related parts, references can be made to related descriptions in the method embodiment.

The previous descriptions are merely embodiments of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for application redirecting, comprising:
   determining whether an invoking condition corresponding to a jump control of a home application is triggered, wherein the jump control is associated with at least one destination application, and the destination application includes one or more of (a) a sub-application of the home application or (b) another application, wherein determining whether the invoking condition corresponding to the jump control of the home application is triggered includes:
      obtaining behavior trajectory information of a user in the home application, wherein the behavior trajectory information includes a first temporal order of pages visited in the home application;
      determining whether the behavior trajectory information matches target behavior trajectory information corresponding to the jump control, wherein the target behavior trajectory information includes the first temporal order of pages or a second temporal order of pages in the home application; and
      in response to determining that the behavior trajectory information matches the target behavior trajectory information corresponding to the jump control, confirming that the invoking condition is triggered, wherein the destination application associated with the jump control is an application corresponding to the behavior trajectory information;
   in response to determining that the invoking condition is triggered, invoking the jump control and displaying a jump window associated with the jump control on a current interface corresponding to the home application; and
   in response to an operation directed to the destination application being triggered by the user through the jump window, redirecting the user from the current interface to an interface corresponding to the destination application.

2. The method according to claim 1, wherein a plurality of invoking conditions correspond to the jump control, and the destination application associated with the jump control is determined based on a currently satisfied invoking condition.

3. The method according to claim 1, wherein determining whether the invoking condition corresponding to the jump control of the home application is triggered includes:
- obtaining sub-application information browsed by the user in the home application;
- determining whether the sub-application information matches target sub-application information corresponding to the jump control; and
- in response to determining that the sub-application information matches the target sub-application information corresponding to the jump control, confirming that the invoking condition is triggered, wherein the destination application associated with the jump control is an application corresponding to the sub-application information.

4. The method according to claim 1, wherein determining whether the invoking condition corresponding to the jump control of the home application is triggered includes:
- determining whether the user authorizes recommendation of the destination application;
- in response to determining that the user authorizes recommendation of the destination application, obtaining one or more of behavior information of the user or client information of the home application, wherein the behavior information includes one or more of information about operation behavior in the home application, information about a received coupon, or information about a geographic location of the user and wherein the client information of the home application includes information about a network to which a client device of the home application is connected;
- determining whether a recommendable destination application is available based on the one or more of the behavior information or the client information of the home application; and
- in response to determining that the recommendable destination application is available, confirming that the invoking condition is triggered, and associating the jump control with the recommendable destination application.

5. The method according to claim 1, wherein in response to the operation directed to the destination application being triggered by the user through the jump window, redirecting the user from the current interface to the interface corresponding to the destination application includes:
- in response to a touch operation performed by the user on the jump window, displaying an indication of the destination application associated with the jump control on the current interface; and
- in response to a jump operation performed by the user with respect to the destination application, redirecting the user from the current interface to the interface corresponding to the destination application.

6. The method according to claim 1, wherein the jump control is associated with a voice collecting control, and wherein the method further includes:
- after invoking the jump control and displaying the jump window associated with the jump control on the current interface,
- in response to a voice collecting operation performed by the user via the voice collecting control, collecting voice information of the user; and
- determining, based on the voice information, the destination application to be redirected to, and redirecting the user from the current interface to the interface corresponding to the destination application.

7. The method according to claim 1, further comprising:
- in response to an operation of disabling the jump control triggered by the user, disabling the jump control, and deleting a mapping relationship between a currently satisfied invoking condition and the jump control.

8. A non-transitory computer readable medium storing contents that, when executed by one or more processors, cause the one or more processors to perform actions comprising:
- determining whether an invoking condition corresponding to a jump control of a home application is triggered, wherein the jump control is associated with at least one destination application, and the destination application includes one or more of (a) a sub-application of the home application or (b) another application, wherein determining whether the invoking condition corresponding to the jump control of the home application is triggered includes:
  - obtaining behavior trajectory information of a user in the home application, wherein the behavior trajectory information includes a first temporal order of pages visited in the home application,
  - determining whether the behavior trajectory information matches target behavior trajectory information corresponding to the jump control, wherein the target behavior trajectory information includes the first temporal order of pages or a second temporal order of pages in the home application, and
  - in response to determining that the behavior trajectory information matches the target behavior trajectory information corresponding to the jump control, confirming that the invoking condition is triggered, wherein the destination application associated with the jump control is an application on corresponding to the behavior trajectory information;
- in response to determining that the invoking condition is triggered, invoking the jump control and displaying a jump window associated with the jump control on a current interface corresponding to the home application; and
- in response to an operation directed to the destination application being triggered by the user through the jump window, redirecting the user from the current interface to an interface corresponding to the destination application.

9. The computer readable medium according to claim 8, wherein a plurality of invoking conditions correspond to the jump control, and the destination application associated with the jump control is determined based on a currently satisfied invoking condition.

10. The computer readable medium according to claim 8, wherein determining whether the invoking condition corresponding to the jump control of the home application is triggered includes:
- obtaining sub-application information browsed by the user in the home application;
- determining whether the sub-application information matches target sub-application information corresponding to the jump control; and
- in response to determining that the sub-application information matches the target sub-application information corresponding to the jump control, confirming that the invoking condition is triggered, wherein the destination application associated with the jump control is an application corresponding to the sub-application information.

11. The computer readable medium according to claim 8, wherein determining whether the invoking condition corresponding to the jump control of the home application is triggered includes:
   determining whether the user authorizes recommendation of the destination application;
   in response to determining that the user authorizes recommendation of the destination application, obtaining one or more of behavior information of the user or client information of the home application, wherein the behavior information includes one or more of information about operation behavior in the home application, information about a received coupon, or information about a geographic location of the user and wherein the client information of the home application includes information about a network to which a client device of the home application is connected;
   determining whether a recommendable destination application is available based on the one or more of the behavior information or the client information of the home application; and
   in response to determining that the recommendable destination application is available, confirming that the invoking condition is triggered, and associating the jump control with the recommendable destination application.

12. The computer readable medium according to claim 8, wherein in response to the operation directed to the destination application being triggered by the user through the jump window, redirecting the user from the current interface to the interface corresponding to the destination application includes:
   in response to a touch operation performed by the user on the jump window, displaying an indication of the destination application associated with the jump control on the current interface; and
   in response to a jump operation performed by the user with respect to the destination application, redirecting the user from the current interface to the interface corresponding to the destination application.

13. The computer readable medium according to claim 8, wherein the jump control is associated with a voice collecting control, and wherein the method further includes:
   after invoking the jump control and displaying the jump window associated with the jump control on the current interface,
   in response to a voice collecting operation performed by the user via the voice collecting control, collecting voice information of the user; and
   determining, based on the voice information, the destination application to be redirected to, and redirecting the user from the current interface to the interface corresponding to the destination application.

14. The computer readable medium according to claim 8, wherein the actions further comprise:
   in response to an operation of disabling the jump control triggered by the user, disabling the jump control, and deleting a mapping relationship between a currently satisfied invoking condition and the jump control.

15. A system, comprising:
   one or more processors; and
   memory storing contents that, when executed by the one or more processors, cause the system to perform actions comprising:
   determining whether an invoking condition corresponding to a jump control of a home application is triggered, wherein the jump control is associated with at least one destination application, and the destination application includes one or more of (a) a sub-application of the home application or (b) another application, wherein determining whether the invoking condition corresponding to the jump control of the home application is triggered includes:
      obtaining behavior trajectory information of a user in the home application, wherein the behavior trajectory information includes a first temporal order of pages visited in the home application;
      determining whether the behavior trajectory information matches target behavior trajectory information corresponding to the jump control, wherein the target behavior trajectory information includes the first temporal order of pages or a second temporal order of pages in the home application; and
      in response to determining that the behavior trajectory information matches the target behavior trajectory information corresponding to the jump control, confirming that the invoking condition is triggered, wherein the destination application associated with the jump control is an application corresponding to the behavior trajectory information;
   in response to determining that the invoking condition is triggered, invoking the jump control and displaying a jump window associated with the jump control on a current interface corresponding to the home application; and
   in response to an operation directed to the destination application being triggered by the user through the jump window, redirecting the user from the current interface to an interface corresponding to the destination application.

16. The system according to claim 15, wherein a plurality of invoking conditions correspond to the jump control, and the destination application associated with the jump control is determined based on a currently satisfied invoking condition.

17. The system according to claim 15, wherein determining whether the invoking condition corresponding to the jump control of the home application is triggered includes:
   obtaining sub-application information browsed by the user in the home application;
   determining whether the sub-application information matches target sub-application information corresponding to the jump control; and
   in response to determining that the sub-application information matches the target sub-application information corresponding to the jump control, confirming that the invoking condition is triggered, wherein the destination application associated with the jump control is an application corresponding to the sub-application information.

18. The system according to claim 15, wherein determining whether the invoking condition corresponding to the jump control of the home application is triggered includes:
   determining whether the user authorizes recommendation of the destination application;
   in response to determining that the user authorizes recommendation of the destination application, obtaining one or more of behavior information of the user or client information of the home application, wherein the behavior information includes one or more of information about operation behavior in the home application, information about a received coupon, or information about a geographic location of the user and wherein the client information of the home application includes information about a network to which a client device of the home application is connected;

determining whether a recommendable destination application is available based on the one or more of the behavior information or the client information of the home application; and in response to determining that the recommendable destination application is available, confirming that the invoking condition is triggered, and associating the jump control with the recommendable destination application.

19. The system according to claim 15, wherein in response to the operation directed to the destination application being triggered by the user through the jump window, redirecting the user from the current interface to the interface corresponding to the destination application includes:

in response to a touch operation performed by the user on the jump window, displaying an indication of the destination application associated with the jump control on the current interface; and in response to a jump operation performed by the user with respect to the destination application, redirecting the user from the current interface to the interface corresponding to the destination application.

20. The system according to claim 15, wherein the jump control is associated with a voice collecting control, and wherein the method further includes:

after invoking the jump control and displaying the jump window associated with the jump control on the current interface, in response to a voice collecting operation performed by the user via the voice collecting control, collecting voice information of the user; and determining, based on the voice information, the destination application to be redirected to, and redirecting the user from the current interface to the interface corresponding to the destination application.

21. The system according to claim 15, wherein the actions further comprise:

in response to an operation of disabling the jump control triggered by the user, disabling the jump control, and deleting a mapping relationship between a currently satisfied invoking condition and the jump control.

* * * * *

UNITED STATES PATENT AND TRADEMARK OFFICE
CERTIFICATE OF CORRECTION

PATENT NO. : 11,397,597 B2
APPLICATION NO. : 17/363795
DATED : July 26, 2022
INVENTOR(S) : Li Yang et al.

It is certified that error appears in the above-identified patent and that said Letters Patent is hereby corrected as shown below:

In the Claims

Column 24, Claim 8, Line 38:
"in an application on corresponding" should read: --in an application corresponding--.

Signed and Sealed this
Eighteenth Day of June, 2024

Katherine Kelly Vidal
*Director of the United States Patent and Trademark Office*